United States Patent [19]
Buchanan

[11] Patent Number: 5,758,355
[45] Date of Patent: May 26, 1998

[54] SYNCHRONIZATION OF SERVER DATABASE WITH CLIENT DATABASE USING DISTRIBUTION TABLES

[75] Inventor: David D. Buchanan, Los Altos Hills, Calif.

[73] Assignee: Aurum Software, Inc., Santa Clara, Calif.

[21] Appl. No.: 695,242

[22] Filed: Aug. 7, 1996

[51] Int. Cl.⁶ .................................................. G06F 17/30
[52] U.S. Cl. ............................... 707/201; 707/1; 707/200
[58] Field of Search ........................... 707/1–19, 101–9, 707/201

[56] References Cited

U.S. PATENT DOCUMENTS

| | | | |
|---|---|---|---|
| 4,945,474 | 7/1990 | Elliott et al. | 395/182.14 |
| 5,129,082 | 7/1992 | Tirfing | 707/3 |
| 5,404,508 | 4/1995 | Konrad et al. | 707/202 |
| 5,455,946 | 10/1995 | Mohan et al. | 707/202 |
| 5,499,359 | 3/1996 | Vijaykumar | 707/201 |
| 5,499,367 | 3/1996 | Bamford et al. | 707/8 |
| 5,592,530 | 1/1997 | Brockman | 379/34 |
| 5,613,113 | 3/1997 | Goldring | 707/202 |
| 5,640,561 | 6/1997 | Satoh | 707/202 |

OTHER PUBLICATIONS

Kroenke, D., "Database Processing: Fundamentals, Design, Implementation", Science Research Associates, Inc., pp. 439–479 (1995).

Primary Examiner—Thomas G. Black
Assistant Examiner—Diane D. Mizrahi
Attorney, Agent, or Firm—Wilson, Sonsini, Goodrich & Rosati

[57] ABSTRACT

A storage medium encoded is provided for use in synchronization of a server database, which includes a plurality of tables and which is accessible on a server computer system, and a client database, which is accessible on a client computer system and which includes a subset of the tables in the server database, the storage medium comprising a first distribution point table in the server database which has the property that modification of such first distribution point table may influence distribution of information from the server database to the client database during a synchronization of the server database and the client database; a first distribution table which corresponds to the first distribution point table which is separate from the server database application tables and which includes identification information that identifies occurrences of information within the server database that may require distribution to the client database during a synchronization of the server database and the client database; and a first extract program which references the identification information in the first distribution table and corresponding information in the first distribution point table to identify information in the first distribution point table to be distributed to the client database during a synchronization of the server database and the client database.

43 Claims, 2 Drawing Sheets

SYNCHRONIZATION OF SERVER DATABASE WITH CLIENT DATABASE USING DISTRIBUTION TABLES

BACKGROUND OF THE INVENTION

1. Field of the Invention

The invention relates to distributed databases, and more particularly, to distributed relational databases in which a client computer maintains a database that is a subset of a server database.

2. Description of the Related Art

There are database applications in which different client computers may have access to different subsets of a shared server database. The client computers may be portable remote computers, and the server database may be maintained by a powerful server computer, for example. The contents of the shared database may change, and the client computers periodically download updated information from the shared database to ensure that the remote database subsets are current and accurate. Conversely, the client computers also may periodically upload information to the shared database. This bidirectional exchange of information between the server and client databases is referred to as database synchronization.

A consideration in Relational Database Management Systems (RDBMS) is the recovery of database information in the event of a system disruption due, for example, to a computer failure. Database recovery techniques often involve periodically saving the database to a backup storage unit and maintaining a transaction log file which logs changes made by transactions against the database since the save. Database Processing by David M. Kroenke, Prentice-Hall, Inc., 1995, pages 466–471, discusses several exemplary database recovery processes. Some examples of log file recovery techniques are disclosed in Mohan, et. al., U.S. Pat. No. 5,455,946, issued Oct. 3, 1995; Konrad, et. al., U.S. Pat. No. 5,404,508, issued Apr. 4, 1995; and Elliott et. al., U.S. Pat. No. 4,945,474, issued Jul. 31, 1990.

Prior approaches to database synchronization often accessed a transaction log file, maintained for database recovery purposes, to ascertain what changes were made to a server database since the last synchronization. An objective of a server synchronization for any client computer typically is to extract from the server database all records in the user subset that have been modified since that remote computer last performed a synchronization. Extract records are identified by referring to the log file to determine which records have changed. In order to reduce the volume of information sent during synchronization, only the extract records for that user subset are downloaded to the remote computer.

While such earlier approaches to database synchronization generally have been acceptable, there have been shortcomings with their use. For instance, there is the potential for conflict between the RDBMS log file process and the synchronization process. More particularly, in a typical RDBMS the transaction log file is the busiest file in the system, since every update of any record in any table in the database is recorded in the log file. Consequently, the RDBMS is constantly appending information to the transaction log file. The log file approach to database synchronization described above also requires access to the log file. In particular, log file type synchronization often involves reading the entire log file from the time of a remote computer's last synchronization. Each record in the log file is read, and then logic is executed to determine whether a changed record image should be extracted for a specific client computer involved in a synchronization. Separate synchronizations may be required for each of several different client computers, since different client computers may contain different database subsets, and therefore, may require different extract records. Alternatively, the synchronization process could read the log file once and produce extract files for all remote users. The synchronization process and the RDBMS logging process, therefore, may be in direct conflict with each other because each requires access to the transaction log file. The RDBMs cannot be appending records to the end of the log file while the log file is being read for synchronization. The conflict problem becomes more acute as the number of remote computers, the number of record updates and the size of the transaction log file increase.

Another problem with the log file approach to database synchronization is that there may be records that should be extracted and downloaded during database synchronization, but which do not exist in the log file. The log file generally contains only records that have been modified. However, there may be situations in which the modification of one record implicates other records which should be extracted for downloading despite the fact that those other records have not been modified. If these additional records are not extracted and propagated to the remote database, then the remote database will have gaps which shall be referred to herein as, "black holes."

For example, using a log file approach, a sales representative may be assigned to a sales team in which each team member has a portable client computer with access to a server database subset relating to the team's sales territory. Each team has company records assigned to it. The company records, for example, may indicate not only which companies are associated with a particular team, but also may identify records in a contact table that specify the contact persons at the company. The server database includes a team table which relates sales representatives to sales teams. Whenever a new team member is added to a sales team, the server database team table is updated, and the RDBMS updates the transaction log file to show the change to the team table. When the new sales team member synchronizes his or her remote client computer, the server log file is scanned to identify extract records to be download.

However, not all records that should be extracted from the server database for download have been modified, and therefore, not all such records will be identified in the log file. In particular, although the new team table record exists in the log file, it has been modified, and, therefore, none of the company records that relate to the new sales team member's team exist in the log file because the company records have not been modified either. Such company records, however, should be distributed to the new sales team member's client computer during synchronization, even though they have not been modified, since they are part of the sales team's database subset. These particular extract records, however, cannot be identified by access to the log file since they have not been modified. Hence, there can be problems identifying certain extract records using some prior log file synchronization processes.

A possible alternative to the log file approach is to add logic, which for each modification of a record in the database, builds all the necessary distribution records at the time the records are being modified. Unfortunately, this alternative approach is not net change, and during subsequent synchronization, redundant changes could be sent to the remote client database. For instance, a sales representative might have a client database that requires synchronization. Furthermore, there may be a database distribution rule that permits the sales representative to access only a certain subset of team records within the server database. Moreover, the particular team records accessible by the sales representative may depend upon the team to which the representative is assigned. A problem arises, however, if in between two synchronizations, a sales representative was assigned to a new team, de-assigned to this team, and reassigned to the team. Using the above-described log file approach or the above-described alternative approach, a full set of the new team records would be extracted, a full set of deletes for those team records should be extracted, and a second set of the new team records would be also extracted. These would be redundant changes.

Thus, there has been a need for improvement in the synchronization mechanisms employed between server databases and client databases. Specifically, there has been a need for improvements in the selection of information to be distributed from a server database to a client database. There also has been a need for such a mechanism that can identify such distribution information even if such distribution information has not changed since the last synchronization. There also has been a need for such a mechanism that can identify such distribution information on a net change basis. The present invention meets these needs.

SUMMARY OF THE INVENTION

The present invention provides novel data structures and processes for use in extracting information from a server database during the synchronization of the server database and a client database. Novel distribution tables, which are distinct from the server database application schema, are used by novel processes to locate information in the server database that may require extraction during the synchronization. The distribution tables can be used to identify information in related server database tables that requires extraction because the information has changed since the last synchronization. Consequently, the distribution tables obviate the need to resort to a transaction log file to identify changed information. The distribution tables also can be used to identify related server database tables that may contain information to be extracted based upon changed relationships among information in the server database, rather than based upon some change in the actual contents of such related server tables. Thus, the distribution tables can avoid the appearance of so called, "black holes" in a synchronizing client database. Finally, the distribution tables are maintained as part of the synchronization process, and the distribution tables cannot be modified during a synchronization extract phase. As a result, synchronization occurs on an efficient net change basis.

DETAILED DESCRIPTION OF THE PREFERRED EMBODIMENT

The present invention comprises a novel method and apparatus for improved distribution of database information during the synchronization of a server database and a client database. In particular, the present invention is primarily concerned with the extract of information from the server database for distribution to a client database. The following description is presented to enable any person skilled in the art to make and use the invention. Descriptions of specific applications are provided only as examples. Various modifications to the preferred embodiment will be readily apparent to those skilled in the art, and the general principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Hardware Environment

Figure 1:
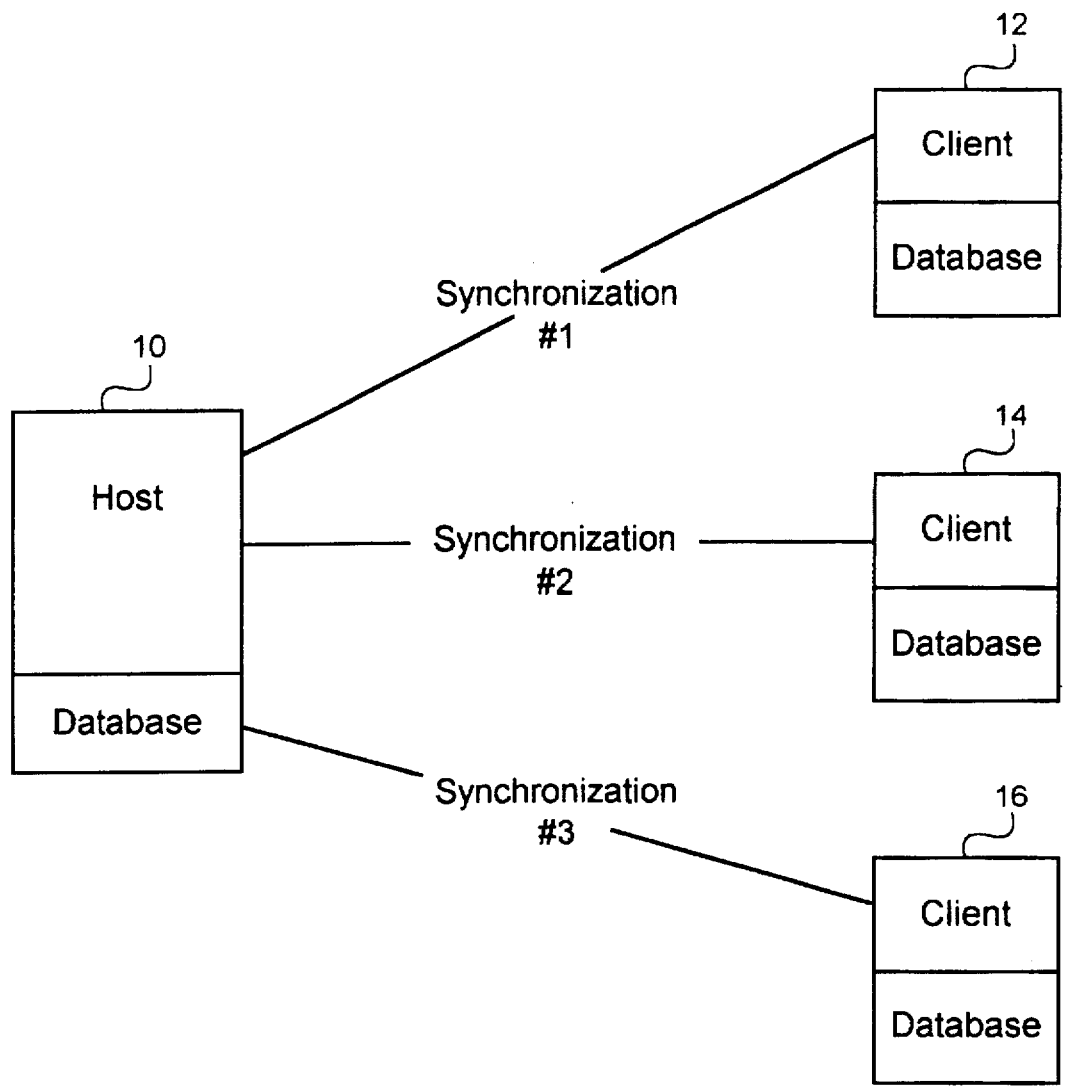
FIG. 1 is an illustrative block diagram of a server computer system and a plurality of remote client computer systems that can employ the apparatus and methods of the presently preferred embodiment of the invention.

Referring to the illustrative drawings of FIG. 1, there is shown a block diagram of a server computer system 10 which manages a shared server database and multiple client computers 12, 14 and 16 each of which accesses a different subset of the shared server database. These server database subsets shall be referred to herein as client databases. The server computer system includes storage media encoded with the server database, a RDBMS distribution structures and related programs used during database synchronization. Each client computer includes storage media encoded with, a RDBMS and a complete copy of the subset of the server database appropriate to that client. Users of the client computers can run applications using the client databases without being connected to the server database. Later, during synchronization, the server database is updated with information entered on the client computers, and conversely, the client computers are updated with new information entered on the server computer. The different client databases are synchronized with the server database through separate bi-directional synchronization processes as indicated in the drawing and as described below.

Overview

In the presently preferred embodiment of the invention, a server computer system maintains a server database in electronic memory. Information within the server database can be shared with different client databases which may contain different subsets of the server database. In addition to the server database, the server system maintains structures in electronic memory, which shall be referred to herein as distribution tables, which inform a database synchronization process of the distribution information which is to be extracted from server database tables for distribution to different client databases.

A distribution table can be created during database set up for each server database table for which a modification may affect the distribution of information between another server database table and a client database. Server database tables possessing the property that their modification may affect the distribution of other server database table information shall be referred to herein as a distribution point tables. Thus, a distribution point table is created for a given server table if modification of such server table may modify the set of information that is required to be extracted from the server database for distribution to some given client database in the course of synchronization of the server and the given client database. In the presently preferred embodiment of the invention, a server database table is defined as a distribution point table and requires a corresponding distribution table if there are any columns in such server database table that have the property that modification of the column's data values could affect the distribution set for this or other tables. The distribution set for a given client database is defined herein as the subset of records from the server database that are extracted for distribution to such given client during synchronization of such client and server databases. In the current embodiment, every data distribution point table has a distribution table maintained for it.

It will be appreciated that in the present embodiment, a distribution table is a data structure in electronic memory that is separate table from its corresponding server database table. More specifically, a distribution table is separate from the server database in that it is not one of the server database application tables. Hence a distribution table is not an application table that is available for general purpose application processing. Rather, it is a system table that is created solely to support synchronizations and is used only during synchronizations. It is "maintained" during the initial phase of the synchronization host extract process and then is referenced later in the host extract process to identify different distribution sets for different synchronizing clients. In a presently preferred embodiment of the invention, a distribution table includes an identification field for a synchronization client user and a set of fields, such as a primary key, that uniquely identifies record occurrences within a corresponding distribution point table, for example. The distribution table, therefore, represents a distribution set of records from a corresponding server database table for synchronizing clients.

A database synchronization process may employ multiple distribution tables during the synchronization of a given client database. Moreover, distribution tables may be created for other server database tables that are subsetted during a client database synchronization, but which do not necessarily possess the property that modification of such server table may modify distribution requirements for such table or other server tables.

More particularly, a distribution relation table is a server database table that possesses the property that information subsetted from it for distribution during a synchronization process may be affected by modifications to another server table. Note that as explained below, a single table may serve as both a distribution point table and a distribution relation table. Although a distribution relation table may be subsetted during the extraction portion of a synchronization process, it does not include columns for which the modification of data values would affect the distribution sets for itself or other tables. In the current embodiment, a distribution relation table can be further defined as any table which has records to be subsetted based upon a relationship directly to a distribution point table, or indirectly, through another intermediate distribution relation table, to a distribution point table. More specifically, a distribution relation table can be defined as a table that is subsetted during an extract process and for which at least one criteria for identification of record subsets is based upon a relationship to another table rather than upon the distribution relation table's own column values.

During synchronization of a given client database, the synchronization process uses the distribution tables to extract subset records from distribution relation tables, directly or indirectly, so that the subsetted information can be distributed to a synchronizing client. More particularly, in the current embodiment only the subset of the records in a server distribution relation table that require distribution to a given synchronizing client is extracted from that server database table for distribution to that client. In other words, one set of records in a distribution relation table may pertain to one client and another set of records in that distribution relation table may pertain to another client, for example. Only the one or the other set of records is extracted during a given synchronization, depending upon whether it is the one or the other client that is synchronizing.

Thus, during synchronization of a given client database, only the server database information to be distributed to such synchronizing client is extracted. Distribution tables advantageously permit this limited extraction without the need to access a log file.

The distribution point tables and distribution relation tables within the server database include time stamp information indicating when records were modified. They also include modifier information indicating who last modified records within such tables. During the synchronization process, time stamp information and modifier information are used to determine whether information must be extracted from server database tables.

In the presently preferred embodiment, even server database tables that are not subsetted (i.e., all records sent to synchronizing client) contain time stamp and modifier information columns to indicate whether or not the table has been updated since the last synchnronization by a given client. If there has been an update, then the entire server table (all records) is transferred to the given synchronizing client. If there has not been an update since the last synchronization then the table is not sent.

Distribution tables of the presently preferred embodiment of the invention provide a distribution flag which indicates whether or not distribution requirements for a synchronizing client have changed since the last synchronization of that client. If the requirements have changed since the last synchronization, then subsetted distribution relation table information is distributed to such synchronizing client without regard to time stamp and last modifier information. That is, even if the time stamp and last modifier information indicates that there has been no change in the subsetted records, those subsetted records are transferred to the synchronizing client if the distribution flag indicates changed distribution requirements.

Thus, the server computer system maintains data distribution tables for use in conjunction with the server database. The distribution tables inform the synchronization process as to the different server database information to be distributed to different clients. Significantly, the distribution tables can be used to identify server database information that requires distribution to a synchronizing client database, even if the identified (subsetted) server information itself has not changed since the last synchronization of that client database. In other words, the need to distribute may be based upon a change in distribution requirements for the synchronizing client rather than based upon a change in the actual distributed information. The distribution tables, therefore, obviate the need to refer to the log file to locate update information. Moreover, since the synchronization can cause distribution of subsetted server database distribution relation table information based upon such changed distribution alone, regardless of whether the information has been modified, gaps or "black holes" in a client database can be more readily avoided.

Figure 2:
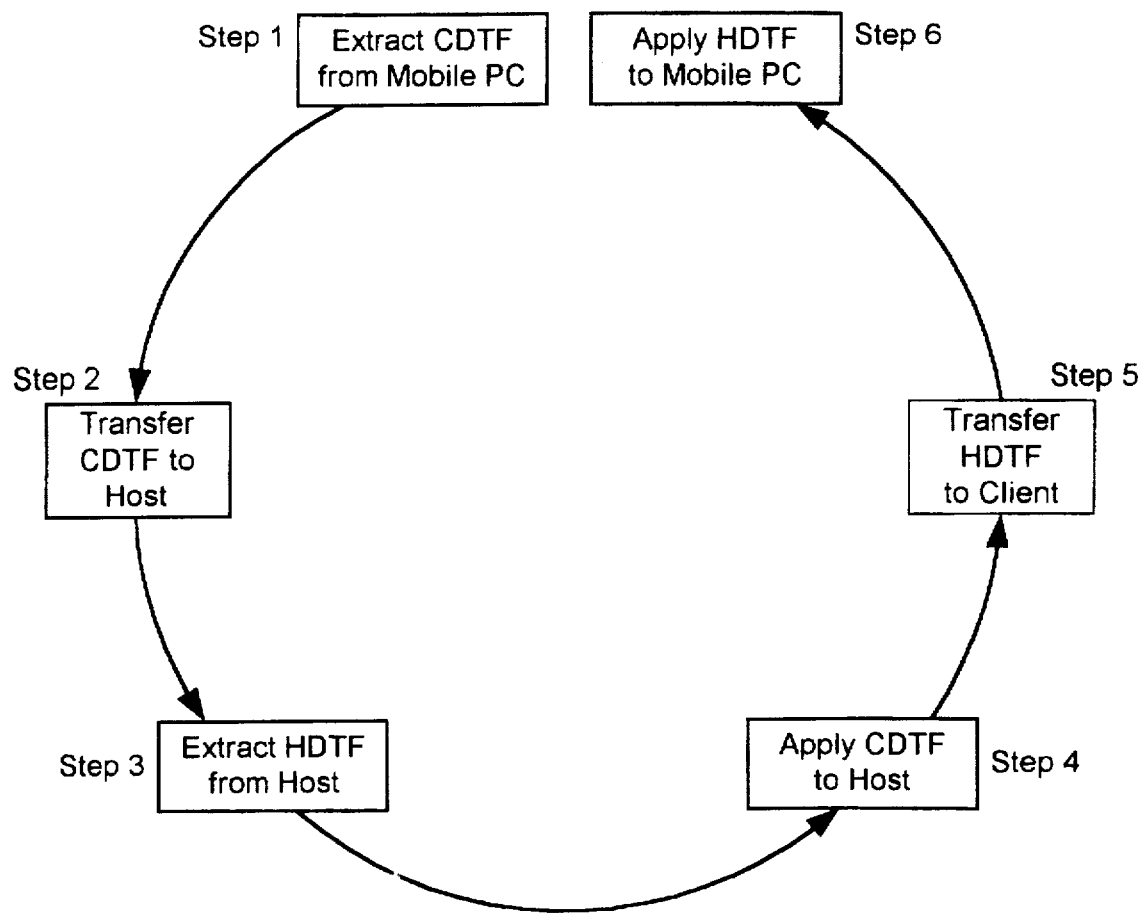
FIG. 2 is a simplified flow diagram illustrating steps in a bidirectional database synchronization process employing apparatus and methods of the presently preferred embodiment of the invention.

Referring to the illustrative drawings of FIG. 2, there is shown a generalized flow diagram of a synchronization process in accordance with a presently preferred embodiment of the invention. First, scan the client database and build a flat file containing the extracted database records which shall be referred to as a, Client Data Transfer File (CDTF). Second, transfer the CDTF file to the server computer system. Third, scan the server database and build a flat file containing the extracted database records which shall be referred to as a, Server Data Transfer File (HDTF). Fourth, apply the CDTF records into the Server database. Fifth, transfer the HDTF file to the client computer. Sixth, apply the HDTF records into the client database.

The focal point of the present invention is the third step, scanning the server database to extract server database records to be transferred to the synchronizing client database. An important advantage of the presently preferred embodiment of the invention is that the server database extract portion of the synchronization process scans the server database directly rather than reading from a log file of database modifications. Consequently, there is no contention between the log file process and the synchronization process. The remaining steps in the synchronization process generally are well known and need not be described in detail herein, although certain aspects of the sixth step, such as reassignments, record deletions and de-assignments, are novel and are explained below.

In the current embodiment, the database scans are done on a table by table basis in referential integrity order. Referential integrity order is derived from the foreign key relationships maintained between multiple tables. In the preferred approach, the data transfer files are built as the records are extracted and are applied in the same order on the other computer. This procedure avoids referential integrity constraints since all foreign key dependent records are inserted after the foreign key itself.

Exemplary Server Database Tables and Data Distribution Tables

The following sections provide illustrative examples of three types of data structures employed in the presently preferred embodiment of the invention. In the currently preferred embodiment these structures are tables. These tables are described in the context of a hypothetical situation in which remote sales representatives possess associated client databases which receive all record occurrences within an Employee Table, a Sales Team Table and a Team Link Table but only some of the records within a Company Table and a Contact Table. Each remote representative can access all employee records and all sales team records and determine who is on each team. However, each sales representative's client database receives only the particular Company Table records that are related to a team for which an associated remote employee is included. In the exemplary situation, joeb's client database contains company records only for Acme Tools and Western Boots. The client database for marys contains company records only for Bathe Stores. The Contact Table is subsetted by its direct relationship through the common key value of "company id" to the Company Table. The client database for joeb contains the contacts for Acme Tools and Western Boots: Jeff Camp, Mary Teele and Abe Matson. The client database for marys contains the contacts for Bathe Stores: Steve Smith.

Thus, each client database includes all records from the server database's Employee Table, Sales Team Table and Team Link Table. However, each client database includes only a subset of the records from the server database Company Table and from the server database Contact Table. The tables in the hypothetical example are as follows.

Employee Table

| employee code | |first name | |last name | |rowid | |modify date | |modify employee |
|---|---|---|---|---|---|
| joeb | |Joe | |Brown | |21 | 11/11/96 | |steve |
| marys | |Mary | |Smith | |23 | 11/11/96 | |steve |

Sales Team Table

| sales team | description | |row id | |modify date | |modify employee |
|---|---|---|---|---|
| northwest | |Northwest End User Sales | |23 | 11/11/96 | |steve |
| oem | |US OEM Sales | |23 | 11/11/96 | |steve |
| southwest | |Southwest End User Sales | |23 | 11/11/96 | |steve |

Team Link Table

| employee code | |sales team | |row id | |modify date | |modify employee |
|---|---|---|---|---|
| joeb | |northwest | |21 | 11/11/96 | |steve |
| marys | |southwest | |22 | 11/11/96 | |steve |

Company Table

| company id | |company name | |sales team | |row id | |modify date | |modify employee |
|---|---|---|---|---|---|
| 22334 | |Acme Tools | |northwest | |21 | 11/11/96 | |steve |
| 44556 | |Bathe Stores | |southwest | |23 | 11/17/96 | |jeff |
| 77663 | |Western Boots | |northwest | |47 | 9/15/95 | |jeff |

Contact Table

| contact id | |first name | |last name | |company id | |row id | |modify date | |modify employee |
|---|---|---|---|---|---|---|
| 11446 | |Jeff | |Camp | |22334 | |1 | 11/11/96 | |steve |
| 11558 | |Steve | |Smith | |44556 | |2 | 11/17/96 | |jeff |
| 33447 | |Mary | |Teele | |22334 | |3 | 11/5/95 | |abe |
| 66992 | |Abe | |Matson | |77663 | |4 | 9/15/95 | |jeff |

During synchronization, the Employee Table, Sales Team, and the Team Link tables are not subsetted. This is an arbitrary decision. Our example defines the application requirement as all remote representatives will be able to view all employees and all their sales team assignments. The requirement could have been defined differently. Any synchronizing client database obtains the full set of records for these tables for which the modify date is after the last synchronization date and the modifier is other than the synchronizing sales representative's remote client database employee code. As an aside here, the system must use a different employee code for the same user if the user is updating the data directly on the host database than if the user is updating the data in the remote client database. The Employee and Sales Team tables do not need distribution tables since the modification of any column's data value will not affect the distribution sets of any other tables in the server database. However, the Team Link Table fits the parameters for requiring a distribution table since modification to either of the Team Link Table's columns will affect the distribution sets of the server database Company table and the server database Contact table. The distribution table for the Team Link Table follows.

| Distribution Table for the Team Link Table | | |
|---|---|---|
| employee code | sales team | distribution flag |
| joeb | northwest | N |
| marys | southwest | N |

In the current embodiment, the Team Link Table does not have an identification field, but the occurrence of both column data values uniquely identifies a record. That is, the "employee code" column and the "sales team" column provide distribution information that indicates distribution requirements for a synchronizing client. In essence, the Distribution Table for the Team Link Table supports the following distribution rules: for (client) joeb, distribute records that relate to the northwest team; and for (client) marys, distribute records that relate to the southwest team. The "employee code" column of the Distribution Table for the Team Link Table is used not only to identify record distributions, but also to identify which synchronization client database owns the record occurrences within the Distribution Table for the Team Link Table. That is, the employee code column provides client database identifier information for use during synchronization.

The Company Table also fits the parameters for requiring a distribution table since modification of the sales team column in the Company Table both affects which Company Table records and which Contact Table records are distributed to synchronizing client databases. The distribution table for the Company Table follows. In essence, the Distribution Table for the Company Table supports the following distribution rules: for (client) joeb, distribute records that relate to "company id" 22334 and 77663; and for (client) marys, distribute records that relate to "company id" 44556.

| Distribution Table for the Company Table | | |
|---|---|---|
| employee code | company id | distribution flag |
| joeb | 22334 | N |
| joeb | 77663 | N |
| marys | 44556 | N |

Each of the above distribution tables includes a distribution flag field. In the present implementation, the distribution flag within a distribution table is used to indicate whether or not the distribution rules (as represented in the distribution table), have changed for the currently synchronizing client since that client's last synchronization. In the above example, "N" signifies, "no", there has been no change in distribution rules, and "Y" signifies, "yes", there has been a change in distribution rules. Whenever there is a modification in a server table that results in a new entry to a distribution table then certain records in an associated distribution relation table must be extracted during the synchronization process. For example, the Contact Table is a distribution relation table with respect to the Company Table. Thus, for instance, if a new company record is added to joeb's Distribution Table for the Company Table, then the distribution flag will be set to "Y" (yes). The next synchronization for joeb will include a copy of all records in the Contact Table which are related to such new company record.

The distribution flags in the distribution tables reduce the possibility of gaps or "black holes" in a client database which might otherwise occur when the distribution rules for certain data records change. Specifically, for example, changes to the relationships set forth in the Company Table can impact the required distribution of records in the Contact Table, and changes to the relationships set forth in the Team Link Table can impact the required distribution of records in both the Company Table and the Contact Table. Thus, even though there may have been no changes to the Contact Table or the Company Table, the records in those tables relating to the synchronizing representative are extracted and transferred to the representative's client database. That means that the extract and transfer occurs without regard to a last modified time stamp information or to last modifier information in the Company and Contact Tables.

It will be appreciated that the distribution tables are data structures maintained by the server computer system separate from the server database application schema. This means that the distribution tables are distinct tables from the application database tables and are not used for any other application processing. Rather, the distribution tables guide the synchronization process during extract of server database information for distribution to synchronizing clients. Specifically, for example, each of the above distribution tables includes an "employee code" column which can be used during synchronization to identify records of interest to a synchronizing client. Furthermore, the distribution table for the Team Link Table includes a "team link" column which can be used to identify records that require update in the distribution relation tables referred to as the Company Table and the Contact Table. Additionally, the distribution table for the Company Table includes a "company id" column which can be used to identify records in the distribution relation table referred to as the Contact Table that may require update. The "team link" and "company id" fields are foreign keys that are used to indicate relationships between tables in the relational database.

In the presently preferred embodiment of the invention, a single table may serve as both a distribution point table and a distribution relation table. An example of this is the Company Table. In the hypothetical example, there is a rule that includes company records with a specific team value if the representative is a member of this team. Thus, the Company Table is a distribution relation table to the Team Link Table which itself is a distribution point table. However, if the Company Table sales team column is modified, then Company Table acts as a distribution point for the Company Table itself and as a distribution point for the distribution relation table, Contact Table.

In accordance with a presently preferred implementation of the invention, a (primary) distribution relation table can optionally have a distribution table built for it. A performance reason for building such a distribution table is that other (secondary) distribution relation tables may be joined to a distribution point table through such a distribution table. More specifically, a new distribution table can be built for a primary distribution relation table. The new distribution table can serve as a distribution table for secondary distribution relation tables in order to reduce the number of secondary distribution relation tables that must be joined from the one primary distribution relation table.

The advantages of adding new distribution tables may be significant when there are a large number of secondary distribution relation tables related through a single primary distribution relation table. In the absence of a distribution table for the primary distribution relation table, the subsetting of the primary distribution relation table typically is performed redundantly for each of the secondary distribution related tables. However, adding a distribution table for the primary distribution relation table causes that join to happen once and then be referenced repeatedly for the secondary distribution relation tables.

Maintaining Distribution Tables

In the presently preferred embodiment, the process of maintaining distribution tables occurs at the beginning of a server extract cycle and is implemented with a stored computer program on the server database system. The functional requirement of this maintainenance process is to read through all modified records in the database tables that affect distribution to a synchronizing client database and to maintain the distribution tables for that client. Thus, the maintainenance process is run as part of each client database's synchronization extract and maintains the distribution sets within the distribution tables for only the client that is currently synchronizing.

An important corollary effect of the initial distribution table maintenance is that the distribution tables represent the working set of records to distribute for the synchronizing client during the extract. For example, if new team link records or company records are added after the distribution tables have been maintained these records and their related records will not be extracted until the next synchronization for this client. This will prevent the extraction of what will be referred to herein as orphan records. Orphan records are records whose parent records were stored in a table after that table was extracted so it did not make it into the extract file, but the child record was stored before the extract process got to that table so it could be included in the extract. The overall effect of determining the set of distribution records for a synchronizing client database at the beginning of the extract process is that the set is not impacted by records updated in the database during the extract process. As a consequence, the database synchronization process can run concurrently, rather than in contention, with general purpose update and extract of the database.

It is important to note that the first task the maintenance program executes is to save a time-date stamp that will be used as the synchronizing client's last synchronization date for the next synchronization if the current synchronization completes successfully. This will guarantee that any records modified in the server database tables during the maintenance or extract process will be extracted on the next synchronization cycle of the currently synchronizing client.

Basically, the maintain process involves checking numerous possible combinations within the database to determine which records should be added to or deleted from a distribution table. It will be appreciated that there can be many different ways that a specific record can be included in the distribution set for a particular client. For example, in the present embodiment, the synchronization process operates on what can be termed a "snapshot" of the server database, i.e. its configuration at some moment in time. Distribution tables are maintained at the start of the synchronization process. After the data distribution tables have been maintained, the snapshot of the database remains fixed for the remainder of the synchronization process. Moreover, changes that relate to the distribution point tables or to the distribution relation tables and that arrive after the start of the synchronization process, either during maintenance or during extract and transfer, are not picked up by the synchronizing client until that client's next synchronization.

During the maintainenance portion of the synchronization process, the distribution point table records relating to the synchronizing client are first evaluated to determine whether or not there have been any deletions, and then the distribution point table records are evaluated to determine whether there have been any updates or any new inserts. The deletions are processed first so that deleted records are not checked for updates. If there has been a deletion of a record then there is likely to be no time stamp information or last modifier information to indicate the deletion since the record that would contain the time stamp has been deleted. Consequently, the distribution tables themselves are evaluated directly to verify that there is a match between each data distribution table entry and a corresponding distribution point table. A mismatch may occur, for example, because a corresponding distribution point table entry has been deleted; or because a client database identified (either directly or through a "user id" for example) in the distribution point table has changed; or because, for instance, the distribution rule (the team in the above hypothetical) has changed. Next, updates and inserts to distribution point tables are evaluated by observing time stamp information to determine when the relevant records were last modified. If a time stamp is more recent than the last synchronization event by the synchronizing client then the record has been modified through update or insert.

The distribution tables are maintained based upon the information gleaned through the processes just described. That is, the distribution tables are altered, if necessary, to accurately represent any modification of the distribution rules derived from the distribution point tables at the moment of the database snapshot. Also, for each record inserted into a distribution table, the distribution flag is set to "yes". The flags must all be reset to "no" at the beginning of the maintenance process or at the end of the extract process.

Thus, a maintainenance process, in accordance with the presently preferred embodiment of the invention, focuses upon the distribution tables instead of the log file. Rather than read through an entire log file to identify server database changes that may require extract during the synchronization of a given client, a maintainenance process merely evaluates whether there have been changes to records in the server database tables, particularly distribution point tables, that relate to that client. These changes are used to maintain accurate distribution tables. The distribution tables are the data structures actually used during synchronization to guide the synchronization process in the identification of record subsets to be extracted from the server database for distribution to the synchronizing client database.

This maintenance process is far more efficient than a log file based approach since the maintenance process is only examining the set of modified records for a single synchronizing client within the distribution point tables. These distribution point tables are regular database tables that can be indexed for efficient access directly to the appropriate records. Conversely, a log file approach typically examines all modified records for all clients even if these records do not modify the distribution set for the synchronizing client.

Processing the Distribution Tables

The synchronization process includes extract processes which operate on the distribution tables to determine the subsets of records that are to be selected from the server database for different distribution point tables and for the respective distribution relation tables that are related through different respective distribution tables. As an example, when the Company Table is extracted a sql (structure querie language) select statement such as the following can be employed. The select statement represents a short computer program encoded in stored procedures or views in the server database electronic memory that implements the extract process described below.

---
Program Process to Extract from Company Table
through Company Distribution Table
---
Select * from Company_distributionTable, CompanyTable
  where Company_distributionTable.employee_code="employee code"
  and Company_distributionTable.company_id=CompanyTable.company_id
  and CompanyTable.last_modify_date>"employee's last synchronization date"
  and C.․ ․․․․ Table.last_modify_employee!="employee code"
---

The distribution table for the Company Table is used as a set of pointers to join into the Company Table and extract only the company records that are in the distribution set for this user/employee. The "company id" is a unique primary key for the Company Table and is the join column. In the current implementation, the synchronization process requires two additional fields for each table, the "last_modify_date" (LMD) and the last_modify_employee (LME). The last_modify_date is a time date stamp of when the record has been last modified, and the last_modify_employee is the employee code stamp of the last employee to modify the record. The synchronization process also maintains in the database the last_synchronization_date which is the time stamp of the start of the user/employee's last server extract process.

The above computer program references the distribution table for the Company Table to identify records that may require extraction for the synchronizing client, identified by the "employee code." The "company id" field in the distribution table is used to identify records in the Company Table, which serves as a distribution point table in this case, that may require extract. The LMD and LME information are used to determine whether the identified records really require extraction and distribution. If the records have not been modified since the last synchronization by the synchronizing client, then no extract is required. If the records were last updated by the employee (user) who possess the synchronizing client database, then no update is required.

It will be appreciated that the distribution tables are not needed on the client side because all records on the client will be extracted, and the distribution tables, therefore, are not used in the server apply process.

Additional Distribution Table Example

In the following example, an additional distribution table is added which corresponds to the Contact Table. The Contact Table does not require a distribution table because there are no column values in it that if modified would change the distribution rules for it or any other tables. It should be pointed out that the modification of the "company id" field in the Contact Table would change the distribution of the Contact Table, but the hypothetical application is defined as not allowing the modification of the "company id" field. The Contact Table does act as a distribution relation table because the distribution rule for the Contact Table is defined by the relation of the "company id" field to the Company Table. The distribution rule for the Contact Table is to join from the Company distribution table into the Contact table based upon the join over the "company id" field. A sql statement that can be used to extract records from the Contact Table acting as a distribution relation table to the Company Table is set forth below. The select statement represents a short computer program encoded in stored procedures or views in the server database in electronic memory, and implements the extract process described above.

---
Program Process to Extract from Contact Table
through Company Distribution Table
---
Select * from Company_distributionTable, ContactTable
  where Company_distributionTable.employee_code="employee code"
  and Company_distributionTable.company_id=ContactTable.company_id
  and ContactTable.last_modify_date>"employee's last synchronization date"
  and ContactTable.last_modify_employee!="employee code"
---

One reason to add non-required distribution tables is to achieve improved performance. For instance, if there are tables that are related to the Contact Table, like notes for the contact, or addresses for the contact, for example, then the join from the Company Distribution Table to find the set of contacts for a given employee (client) would be performed redundantly for each table that is related through the Contact Table. Adding a distribution table for the Contact table removes the join to find the set of contacts from the Company Distribution Table and enables selection by employee code out of the Contact Distribution Table. Such an added Contact Distribution Table can have a structure such as the following.

| Distribution Table for the Contact Table | | |
|---|---|---|
| employee code | kontact id | kdistribution flag |
| joeb | 111446 | IN |
| joeb | 166992 | IN |
| marys | 111558 | IN |

Note that the Contact Distribution Table is not required to have a distribution flag column since that can be determined from the relation to the Company Distribution Table.

A select to extract contacts from the server database with the addition of the Contact Distribution Table can be as follows.

---

Program Process to Extract from Contact Table
through Contact Distribution Table

---

Select * from Contact_distributionTable, ContactTable
  where Contact_distributionTable.employee_code="employee code"
  and Contact_distributionTable.contact_id=ContactTable.contact_id
  and ContactTable.last_modify_date>"employee's last synchronization date"
  and ContactTable.last_modify_employee!="employee code"

---

The above select statement represents a short computer program encoded in procedures or views within the server database in electronic memory, and that implements the extract process.

The select statements extracting records from the Contact Table involves a two table join, with or without the Contact Distribution Table. Thus, there is not a big performance advantage with respect to the ContactTable alone. However, when another table is related to the contact by the "contact id" then the Contact Distribution Table eliminates a join. As an example, consider a read from a ContactNotes Table that is related by "contact id" to the Contact table discussed in the following section.

Additional Distribution Relation Table Example

In this example, an additional table is added to the server database which is called the ContactNotes Table. The ContactNotes Table is related through the "contact id" column to the Contact Table. A contact record in the Contact Table can be related to multiple ContactNotes records. The distribution objective for the ContactNotes table is to extract all records which are related to all contact records in the Contact Table which are related to all company records in the Company Table.

| | ContactNotes Table | | | |
|---|---|---|---|---|
| contactid | lnote | lrow id | lmodify date | lmodify employee |
| 11446 | lthis is a note about Jeff Camp. | l23 | l1/11/96 | lsteve |
| 33447 | lMary Teele has a strong background | l23 | l1/11/96 | lsteve |
| 11446 | lJeff is supportive of our sales efforts. | l23 | l1/11/96 | lsteve |
| 11558 | lSteve Smith is a strong proponent. | l23 | l1/11/96 | lsteve |

If there is only a Distribution Table for the Company Table, with no Contact Distribution Table the following select extract statement could be used for the ContactNotes Table.

---

Program Process to Extract from ContactNotes Table
through ContactTable and Company Distribution Table

---

Select * from Company_distributionTable, ContactTable, ContactNotesTable
  where Company_distributionTable.employee_code="employee code"
  and Company_distributionTable.company_id=ContactTable.company_id
  and ContactTable.contact_id=ContactNotesTable.contact_id
  and ContactNotesTable.last_modify_date>"employee's last synchronization date"
  and ContactNotesTable.last_modify_employee!="employee code"

---

If, however, there is a Contact Distribution Table then the following select extract statement could be used for the ContactNotes Table.

---

Program Process to Extract from ContactNotes Table
through Contact Distribution Table

---

Select * from Contact_distributionTable, ContactNotesTable
  where Contact_distributionTable.employee_code="employee code"
  and Contact_distributionTable.contact_id=ContactNotesTable.contact_id
  and ContactNotesTable.last_modify_date>"employee's last synchronization date"
  and ContactNotesTable.last_modify_employee!="employee code"

---

In the above computer program labelled, "Program Process to Extract from ContactNotes Table through Contact Distribution Table", the computer program references the Contact Distribution Table to identify records that may require extraction for the synchronizing client, identified by the "employee code". It will be appreciated that the ContactTable is a distribution relation table which does not fit the definition of a distribution point table. In particular, modification to the ContactTable does not affect the distribution set for the ContactTable or for the ContactNotes Table. Nevertheless, a Contact Distribution Table has been produced for the ContactTable. The "contact id" field in the Contact Distribution Table is used to identify records in the ContactNotes Table, which serves as a distribution relation table in this case, that may require extract. The LMD and LME information are used to determine whether the identified records rely require distribution.

Thus, the addition of the Contact Distribution Table permits the ContactNotes table to be extracted with a two table join rather than a three table join. Each of the above select statements represent short computer programs that can be encoded in computer memory and that can implement an extract process.

A Reassignment Example

The following example of the processing used to support reassignments is illustrates the usage of a distribution flag within a distribution table. Using the above example, the "employee code" column of the TeamLink Table will be updated to change from marys to joeb for the TeamLink table with the row id value of 22.
Before modification:

| Team Link Table | | | | |
|---|---|---|---|---|
| employee code | sales team | row id | modify date | modify employee |
| joeb | northwest | 21 | 11/11/96 | steve |
| marys | southwest | 22 | 11/11/96 | steve |

After modification:

| Team Link Table | | | | |
|---|---|---|---|---|
| employee code | sales team | row id | modify date | modify employee |
| joeb | northwest | 21 | 11/11/96 | steve |
| joeb | southwest | 22 | 11/11/96 | steve |

In the present embodiment, once the modification has been made to the database, the next time joeb undertakes a synchronization, his extract file should include all companies, contacts, and contact notes records related to the southwest team. During the server extract process distribution table maintenance, a new entry is made that relates joeb to the southwest team. The entry for marys will still exist until marys does a synchronization, and then it will be deleted; that is because the above-described maintainenance process only updates distribution table records relating to client marys as part of a marys client synchronization process. The company distribution table also is updated to reflect the new companies that are now related to joeb. Both of these records have a distribution flag set to "Y" to indicate that this is a new entry in the distribution table for this user and that all related records to this "Y" record must be extracted if the modify employee is not the synchronizing employee and if the modify date of the record is earlier than the synchronizing employee's last synchronization date.

| Updated Distribution Table for the Team Link Table | | |
|---|---|---|
| employee code | sales team | distribution flag |
| joeb | northwest | N |
| joeb | southwest | Y |
| marys | southwest | N |

| Updated Distribution Table for the Company Table | | |
|---|---|---|
| employee code | company id | distribution flag |
| joeb | 122334 | N |
| joeb | 177663 | N |
| marys | 144556 | N |
| joeb | 144556 | Y |

The important point is that whenever there is a new distribution record in a distribution table, related records, even though not modified, should be selected. There is an additional extract statement required then for each distribution point or distribution relation table.

| Program Process to Extract from Company Table through Company Distribution Table - Using Distribution Flag |
|---|
| Select * from Company_distributionTable, CompanyTable<br>  where Company_distributionTable.employee_code = "employee code"<br>  and Company_distributionTable.distribution_flag = 'Y'<br>  and Company_distributionTable.company_id =<br>  CompanyTable.company_id<br>  and CompanyTable.last_modify_date < "employee's last synchronization date" |

The exemplary sql statement set forth above will pick up records that have not been modified in server database since a given client's last synchronization date, but which require selection because they are now related to the client based upon a change in a distribution table. A similar statement is necessary for the Contact Table and every distribution relation table.

| Program Process to Extract from Contact Table through Company Distribution Table - Using Distribution Flag |
|---|
| Select * from Company_distributionTable, ContactTable<br>  where Company_distributionTable.employee_code = "employee code"<br>  and Company_distributionTable.distribution_flag = 'Y'<br>  and Company_distributionTable.company_id =<br>  ContactTable.company_id<br>  and ContactTable.last_modify_date < "employee's last synchronization date" |

These sql statements represent short computer programs that can be encoded in electronic memory and can be used to implement the above-described processes.

Record Deletions

Record deletions on the server database are tracked by a trigger which executes a stored sql procedure whenever a record in a table is deleted. Whenever a record is deleted the trigger on that table builds an entry in a DeleteList table. An exemplary format of a DeleteList table in accordance with the present implementation of the invention can be as follows.

| DeleteList Table | | |
|---|---|---|
| table name | |rowid | |createdate |

A server extract process extracts DeleteList records that have been created since an cleint's last synchronization date and inserts them into the HDTF (server data transfer file). A client database apply process in accordance with a current implementation of the invention builds delete statements for each record in the DeleteList table using a format such as the following.

Delete table_name where row_id=row id value

A De-assignment Example

An important requirement of the synchronization process of the present embodiment is to delete records on a client database that have not been deleted on the server database, but have been reassigned away from this employee. An earlier example set forth above involved deleting all the southwest company and contact records in marys' remote database because marys was taken off the southwest team. An additional requirement of the distribution table maintenance process is to build a list of records to be deleted on the client database based upon reassignments. The distribution table maintenance process, when it finds a reassignment that eliminates a relationship, must traverse the database and find all related records and build an entry into the reassignment table for each record to be deleted. In this example the process would find all company records related to the southwest team and all contact and contact note records for those companies and insert the appropriate entries in the reassignment table. The format of the data structure for the reassignments is as follows.

| Reassignment Table | | | |
|---|---|---|---|
| employee code | |create date | |table name | |row id |
| marys | 12/15/96 | |company | 123 |
| marys | 12/15/96 | |contact | 12 |

A server database extract process selects all records from the Reassignment Table for a synchronizing employee where the create date is later than the employee's (client database's) last synchronization date. For each record selected from the Reassignment Table, a DeleteList record format will be placed in the HDTF file, but not in the DeleteList Table on the server database. A client database apply process will process the reassign.

While a presently preferred embodiment of the invention has been described herein, it will be appreciated that there may be numerous variations of, modifications to and improvements upon the preferred embodiment which do not depart from the spirit and scope of the invention which is defined in the appended claims.

What is claimed is:

1. A storage medium encoded for use in synchronization of a server database and multiple respective client databases, wherein the server database includes a plurality of server tables and is accessible on a server computer system, and wherein the respective client databases include respective subsets of the server database and are accessible on respective client computers, the storage medium comprising:

a first distribution point table in the server database which has the property that modification of such first distribution point table may influence the distribution requirements of respective client databases during respective synchronizations of the server database and such client databases;

a first distribution point table separate from the server database application tables which includes respective information that respectively identifies different client databases and that respectively relates the different identified client databases to respective information in the distribution point table that may affect distribution requirements during respective synchronizations of the server database and such respective identified client databases;

a first extract program which identifies information in said first distribution point table to be distributed to a respective synchronizing client database by referencing respective distribution information in the respective first distribution table that identifies such synchronizing client database and by referencing respective related corresponding information in said distribution point table.

2. The storage medium of claim 1, further including:

a first distribution relation table in the server database which has the property that modification of said first distribution point table may influence distribution of information from such first distribution relation table to respective client databases during respective synchronizations of the server database and respective client databases; and a second extract program which identifies information in said first distribution relation table to be distributed to a respective synchronizing client database by referencing distribution information in the respective first distribution table that identifies such synchronizing client database and by referencing respective related corresponding information in said first distribution relation table.

3. The storage medium of claim 2, further including:

update time information in said first distribution relation table;

wherein the second extract program references the update time information in said first distribution relation table to determine whether distribution of information is required from the first distribution relation table to a respective client database during a synchronization of the server database and such respective client database.

4. The storage medium of claim 2, further including:

update client information in said first distribution relation table;

wherein the second extract program references the update client information in said first distribution relation table to determine whether distribution of information is required from the first distribution relation table to a respective client database during a synchronization of the server database and such respective client database.

5. The storage medium of claim 2, further including:

update time information and update client information in said first distribution relation table;

wherein the second extract program references the update time information and the update client information in said first distribution relation table to determine whether distribution of information is required from the first distribution relation table to a respective client database during a synchronization of the server database and such respective client database.

6. The storage medium of claim 1, further including:

a first distribution relation table in the server database which has the property that modification of said first distribution point table may influence distribution of information from such first distribution relation table to respective client databases during synchronizations of the server database and respective client database;

a second distribution relation table in the server database which has the property that modification of said first distribution point table may influence distribution of information from such first distribution relation table to respective client databases during respective synchronizations of the server database and respective client databases; and a second extract program which identifies information in said second distribution relation table to be distributed to a respective synchronizing client database by referencing respective distribution information in the respective first distribution table that identifies such synchronizing client database and by referencing respective related corresponding information in said first distribution relation table and by referencing respective related corresponding information in said second distribution relation table.

7. The storage medium of claims 2 or 6 further including:

a distribution flag in the first distribution table which indicates whether respective distribution rules have been modified for a respective synchronizing client database since a prior synchronization by such respective client database;

wherein the second extract program further references the distribution flag in the first distribution table to determine whether distribution of information is required from the server database to a respective client database during a respective synchronization of the server database and such respective client database.

8. The storage medium of claim 6, further including:

update time information in said second distribution relation table;

wherein the second extract program references the update time information in said second distribution relation table to determine whether distribution of information is required from the second distribution relation table to a respective client database during a synchronization of the server database and such respective client database.

9. The storage medium of claim 6, further including:

update client information in said second distribution relation table;

wherein the second extract program references the update client information in said second distribution relation table to determine whether distribution of information is required from the second distribution relation table to a respective client database during a synchronization of the server database and such respective client database.

10. The storage medium of claim 6, further including:

update time information and update client information in said second distribution relation table;

wherein the second extract program references the update time information and the update client information in said second distribution relation table to determine whether distribution of information is required from the second distribution relation table to a respective client database during a synchronization of the server database and such respective client database.

11. The storage medium of claim 2, further including:

a distribution flag in the first distribution table which indicates whether respective distribution rules have been modified for a respective synchronizing client database since a prior synchronization by such respective client database;

last modify information in the first distribution relation table;

wherein the second extract program further references the distribution flag in the first distribution table and further references the last modify information in the first distribution relation table to determine whether distribution of information is required from the second distribution relation table to a respective client database during a synchronization of the server database and such respective client database in accordance with a rule that distribution is determined to be require if the distribution flag indicates that a modification has occurred.

12. The storage medium of claim 6, further including:

a distribution flag in the first distribution table which indicates whether respective distribution rules have been modified for a respective synchronizing client database since a prior synchronization by such respective client database;

last modify information in the first distribution relation table;

wherein the second extract program further references the distribution flag in the first distribution table and further references the last modify information in the second distribution relation table to determine whether distribution of information is required from the second distribution relation table to a respective client database during a synchronization of the server database and such respective client database in accordance with a rule that distribution is determined to be require if the distribution flag indicates that a modification has occurred.

13. The storage medium of claim 1, further including:

a first distribution relation table in the server database which has the property that modification of said first distribution point table may influence distribution of information from such first distribution relation table to respective client databases during respective synchronizations of the server database and such respective client databases;

a second distribution relation table in the server database which has the property that modification of said first distribution point table may influence distribution of information from such server database distribution relation table to respective client databases during respective synchronizations of the server database and such respective client databases;

a second distribution table separate from the server database application tables which includes respective distribution information that respectively identifies different client databases and that respectively relates the different identified client databases to corresponding information in the first distribution relation table that may affect distribution requirements during respective synchronizations of the server database and such respective identified client databases;

a second extract program which identifies information in said second distribution relation table to be distributed to a respective synchronizing client database by referencing respective distribution information in the respective second distribution table that identifies such synchronizing client database and by referencing respective related corresponding information in said second distribution relation table.

14. The storage medium of claim 13, further including:

update time information in said second distribution relation table;

wherein the second extract program references the update time information in said second distribution relation table to determine whether distribution of information is required from the second distribution relation table to a respective client database during a synchronization of the server database and such respective client database.

15. The storage medium of claim 13, further including:

update client information in said second distribution relation table;

wherein the second extract program references the update client information in said second distribution relation table to determine whether distribution of information is required from the second distribution relation table to a respective client database during a synchronization of the server database and such respective client database.

16. The storage medium of claim 13, further including:

update time information and update client information in said second distribution relation table;

wherein the second extract program references the update time information and the update client information in said second distribution relation table to determine whether distribution of information is required from the second distribution relation table to a respective client database during a synchronization of the server database and such respective client database.

17. The storage medium of claim 13, further including:

a distribution flag in the second distribution table which indicates whether respective distribution rules have been modified for a respective synchronizing client database since a prior synchronization by such respective client database;

wherein the second extract program further references the distribution flag in the second distribution table to determine whether distribution of information is required from the server database to a respective client database during a respective synchronization of the server database and such respective client database.

18. The storage medium of claim 13, further including:

a distribution flag in the first distribution table which indicates whether respective distribution rules have been modified for a respective synchronizing client database since a prior synchronization by such respective client database;

last modify information in the second distribution relation table;

wherein the second extract program further references the distribution flag in the second distribution table and further references the last modify information in the second distribution relation table to determine whether distribution of information is required from the second distribution relation table to a respective client database during a synchronization of the server database and such respective client database in accordance with a rule that distribution is determined to be require if the distribution flag indicates that a modification has occurred.

19. The storage medium of claim 1, further including:

update time information in said first distribution point table;

wherein the first extract program references the update time information in said first distribution point table to determine whether distribution of information is required from the distribution point table to a respective client database during a synchronization of the server database and such respective client database.

20. The storage medium of claim 1, further including:

update client information in said first distribution point table;

wherein the first extract program references the update client information in said first distribution point table to determine whether distribution of information is required from the first distribution point table to a respective client database during a synchronization of such respective server database and the client database.

21. The storage medium of claim 1, further including:

update time information and update client information in said first distribution point table;

wherein the first extract program references the update time information and the update client information in said first distribution point table to determine whether distribution of information is required from the distribution point table to a respective client database during a synchronization of the server database and such respective client database.

22. The storage medium of claim 1, further including:

an update field and an update client field in the first distribution point table;

wherein modification of at least one prescribed column of the first distribution point table may influence distribution of a subset of records from the distribution point table to the client database during a synchronization of the server database and a respective client database; and wherein the first extract program further references the update date field and the update client field in the first distribution point table to determine whether distribution of information is required from the distribution point table to a respective client database during a synchronization of the server database and such respective client database.

23. The storage medium of claim 1 further including:

a distribution flag in the first distribution table which indicates whether respective distribution rules have been modified for a respective synchronizing client database since a prior synchronization by such respective client database;

wherein the first extract program further references the distribution flag in the first distribution table to determine whether distribution of information is required from the server database to a respective client database during a respective synchronization of the server database and such respective client database.

24. The storage medium of claim 1, further including:

a distribution flag in the first distribution table which indicates whether respective distribution rules have been modified for a respective synchronizing client database since a prior synchronization by such respective client database;

last update information in the first distribution point table;

wherein the first extract program further references the distribution flag in the first distribution table and further references the in the last update information first distribution point table to determine whether distribution of information is required from the distribution point table to the client database during a synchronization at distribution is determined to be required if the distribution flag indicates that a modification has occurred.

25. The storage medium of claims 1, 19, 20, 21, 22, or 24 wherein the first distribution point table also serves as a distribution relation table.

26. A storage medium encoded for use in synchronization of a server database and multiple respective client databases, wherein the server database includes a plurality of server tables and is accessible on a server computer system, and wherein the respective client databases include respective subsets of the server database and are accessible on respective client computers, the storage medium comprising:

a first server database table which has the property that modification of different server database table may influence the distribution requirements of respective client databases during respective synchronizations of the server database and such respective client databases;

a distribution table separate from the server database application tables which includes respective distribution information that respectively identifies different client databases and that respectively relates the different respective client databases to respective information in the different server table that may affect distribution requirements during respective synchronizations of the server database and such respective identified client databases; and a first extract program which identifies information in said first server table to be distributed to a respective synchronizing client database by referencing respective first distribution information in the respective first distribution table that identifies such synchronizing client database and by referencing respective related information in said first server table.

27. The storage medium of claim 26, further including:

update time information in said database;

wherein the extract program references the update time information in said first server database table to determine whether distribution of information is required from the first database table to a respective client database during a synchronization of the server database and such respective client database.

28. The storage medium of claim 26, further including:

update client information in said first server database table;

wherein the extract program references the update client information in said first server database table to determine whether distribution of information is required from the first server database table to a respective client database during a synchronization of the server database and such respective client database.

29. The storage medium of claim 26, further including:

update time information and update client information in said first server database table;

wherein the extract program references the update time information and the update client information in said first server database table to determine whether distribution of information is required from the first server database table to a respective client database during a synchronization of the server database and such respective client database.

30. The storage medium of claim 26, further including:

a distribution flag in the first distribution table which indicates whether respective distribution rules have been modified for a respective synchronizing client database since a prior synchronization by such respective client database;

wherein the extract program further references the distribution flag in the distribution table to determine whether distribution of information is required from the first server database table to a respective client database during a synchronization of the server database and such respective client database.

31. The storage medium of claim 26, further including:

a distribution flag in the first distribution table which indicates whether respective distribution rules have been modified for a respective synchronizing client database since a prior synchronization by such respective client database;

an update time field and an update client field in the first server table;

wherein the extract program further references the distribution flag in the distribution table and further references the update time field and the update client field in the first server database table to determine whether distribution of information is required from the first server database table to a respective client database during a synchronization of the server database and such respective client database in accordance with a rule that distribution is determined to be required if the distribution information indicates that a modification has occurred.

32. A server database extract process for use during synchronization of a server database and multiple respective client databases, wherein the server database includes a plurality of server tables and is accessible on a server computer system, and wherein the respective client databases include respective subsets of the server database and are accessible on respective client computers, the extract process comprising the steps of:

providing the server database in an electronic storage medium;

providing in the server database a first distribution point table which has the property that modification of such first distribution point table may influence the distribution requirements of respective client databases during respective synchronizations of the server database and such respective client databases;

providing in the electronic medium, separate from the server database application tables, a first distribution table which includes respective distribution rules that respectively relates different respective client databases to respective information in the distribution point table; and identifying information in said first distribution point table to be distributed to a respective synchronizing client database by referencing respective distribution rules in the respective first distribution table.

33. The process of claim 32 including the further steps:

providing a first distribution relation table in the server database which has the property that modification of said first distribution point table may modify required distribution of information from such first distribution relation table to such a respective identified client database; and identifying information in said first distribution relation table to be distributed to a respective synchronizing client database by referencing respective distribution rules in the respective first distribution table.

34. The process of claim 32 including the further steps of:

identifying modifications in respective distribution rules that relate to a respective synchronizing client database; and modifying the distribution table that is related to such respective identified client database based upon such identified modifications in the distribution rules.

35. The process of claim 32 including the further steps of:

identifying modifications in respective distribution rules that relate to a respective synchronizing client database;

modifying the distribution table that is related to such respective identified client database based upon such identified modifications in the distribution rules;

providing a distribution flag in the first distribution table which indicates whether respective distribution rules have been modified for the respective synchronizing client database since a prior synchronization by such respective client database;

referencing the distribution flag in the first distribution table to determine whether distribution of information is required from the first server database table to a respective client database during a synchronization of the server database and such respective client database.

36. A server database extract process for use during synchronization of a server database and multiple respective client databases, wherein the server database includes a plurality of server tables and is accessible on a server computer system, and wherein the respective client databases include respective subsets of the server database and are accessible on respective client computers, the extract process comprising the steps of:

providing the server database in an electronic storage medium;

providing in the server database a first server database table which has the property that modification of different server database application table may influence the distribution requirements of respective client databases during respective synchronizations of the server database and such respective client databases;

providing in the electronic medium, separate from the server database application tables, a first distribution table which includes respective distribution rules that respectively relates different respective client databases to respective information in the different server database application table that may affect distribution requirements; and identifying information in said first server table to be distributed to a respective synchronizing client database by referencing respective distribution rules in the respective first distribution table and by referencing respective related information in said first server table.

37. A storage medium encoded for use in synchronization of a server database and multiple respective client databases, the storage medium comprising:

a first distribution point table in the server database which includes a column which has the property that modification of entries in such column may influence the distribution of information subsets from at least one server database application table to respective client databases during respective synchronizations of the server database and such respective client databases;

a first distribution table which is separate from the server database application tables and which includes a column which identifies different respective client databases and which includes a column that respectively relates the different respective identified client databases to respective entries in the at least one server database application table for which modification may affect distribution requirements during respective synchronizations of the server database and such respective identified client databases;

first means for identifying information in said first distribution point table to be distributed to a respective synchronizing client database by referencing a respective column in the first distribution table that identifies such respective synchronizing client database and by referencing respective related information in the at least one server database application table.

38. The storage medium of claim 37 wherein the at least one server database application table is the first distribution point table.

39. The storage medium of claim 37, further including:

update time information in said first distribution point table;

wherein said first means references the update time information in said first distribution point table to determine whether distribution of information is required from the at least one server database table to a respective client database during a synchronization of the server database and such respective client database.

40. The storage medium of claim 37, further including:

update client information in said first distribution point table;

wherein said first means references the update client information in said first distribution point table to determine whether distribution of information is required from the at least one server database table to a respective client database during a synchronization of such respective server database and the client database.

41. The storage medium of claim 37, further including:

update time information and update client information in said first distribution point table;

wherein said first means references the update time information and the update client information in said first distribution point table to determine whether distribution of information is required from the at least one server database table to a respective client database during a synchronization of the server database and such respective client database.

42. The storage medium of claim 37, further including:

a distribution flag in the first distribution table which indicates whether respective distribution rules have been modified for a respective synchronizing client database since a prior synchronization by such respective client database;

wherein said first means further references the distribution flag in the first distribution table to determine whether distribution of information is required from the at least one server database table to a respective client database during a respective synchronization of the server database and such respective client database.

43. The storage medium of claim 37, further including:

a distribution flag in the first distribution table which indicates whether respective distribution rules have been modified for a respective synchronizing client database since a prior synchronization by such respective client database;

last update information in the first distribution point table;

wherein said first means further references the distribution flag in the first distribution table and further references the in the last update information first distribution point table to determine whether distribution of information is required from the at least server database table to the client database during a synchronization at distribution is determined to be required if the distribution flag indicates that a modification has occurred.

* * * * *